(12) United States Patent  
Dinh et al.

(10) Patent No.: US 9,110,644 B2  
(45) Date of Patent: *Aug. 18, 2015

(54) PROVIDING ADDITIONAL CURRENT CAPACITY TO A PROCESSOR FOR A TURBO MODE

(75) Inventors: James S. Dinh, Federal Way, WA (US); Robert D. Wickersham, Roy, WA (US); Daniel Kingsley, Steilacoom, WA (US); Edward L. Payton, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 13/616,982

(22) Filed: Sep. 14, 2012

(65) Prior Publication Data

US 2014/0082377 A1  Mar. 20, 2014

(51) Int. Cl.
- *G06F 1/26* (2006.01)
- *G05D 3/12* (2006.01)
- *G05F 1/10* (2006.01)
- *G06F 11/30* (2006.01)
- *H02M 1/00* (2007.01)
- *H02M 3/156* (2006.01)

(52) U.S. Cl.
CPC .. *G06F 1/26* (2013.01); *G05F 1/10* (2013.01); *G06F 11/3058* (2013.01); *H02M 3/156* (2013.01); *H02M 2001/0003* (2013.01)

(58) Field of Classification Search
CPC ...... G06F 1/26; G06F 11/3058; H02M 3/156; H02M 2001/0003; G05F 1/10
See application file for complete search history.

(56) References Cited

U.S. PATENT DOCUMENTS

| | | | | |
|---|---|---|---|---|
| 6,809,504 | B2 * | 10/2004 | Tang et al. | 323/274 |
| 7,085,943 | B2 * | 8/2006 | Chun et al. | 713/300 |
| 8,645,886 | B2 * | 2/2014 | Abhishek et al. | 716/109 |
| 2002/0070718 | A1 * | 6/2002 | Rose | 323/269 |
| 2002/0135338 | A1 * | 9/2002 | Hobrecht et al. | 323/272 |
| 2009/0276641 | A1 * | 11/2009 | Peng et al. | 713/300 |
| 2009/0279224 | A1 * | 11/2009 | Ayyanar et al. | 361/111 |
| 2010/0060083 | A1 * | 3/2010 | Rolland | 307/80 |
| 2011/0133709 | A1 * | 6/2011 | Mengad | 323/271 |
| 2012/0079290 | A1 | 3/2012 | Kumar | |
| 2012/0159198 | A1 * | 6/2012 | Naffziger et al. | 713/300 |

OTHER PUBLICATIONS

Gabriel Torres, "Everything You Need to Know About the Motherboard Voltage Regulator Circuit," Feb. 10, 2010, 10 pages.
International Application No. PCT/US12/28865, filed Mar. 13, 2012, entitled "Providing Energy Efficient Turbo Operation of a Processor," by Intel Corporation.

* cited by examiner

*Primary Examiner* — Ji H Bae
(74) *Attorney, Agent, or Firm* — Trop, Pruner & Hu, P.C.

(57) ABSTRACT

In one embodiment, the present invention includes a primary voltage regulator to couple a regulated voltage to a processor via a supply line. This regulator includes a multi-phase controller to provide the regulated voltage in multiple phases and to provide a maximum current output sufficient to meet a thermal design power (TDP) of the processor. In addition, an auxiliary voltage regulator may be configured to provide an excess current to the processor via the supply line for a time limited duration, e.g., based on the supply line state. Other embodiments are described and claimed.

20 Claims, 8 Drawing Sheets

PROVIDING ADDITIONAL CURRENT CAPACITY TO A PROCESSOR FOR A TURBO MODE

BACKGROUND

Advances in semiconductor processing and logic design have permitted an increase in the amount of logic that may be present on integrated circuit devices. As a result, computer system configurations have evolved from multiple integrated circuits in a system to multiple hardware threads, multiple cores, multiple devices, and/or complete systems on an individual integrated circuit. Additionally, as the density of integrated circuits has grown, the power requirements for computing systems (from embedded systems to servers) have also escalated.

Power and thermal management issues are considerations in all segments of computer-based systems. While in the server domain, the cost of electricity drives the need for low power systems, in mobile systems battery life and thermal limitations make these issues relevant. Optimizing a system for maximum performance at minimum power consumption is usually done using the operating system (OS) or system software to control hardware elements. Most modern OS's use the Advanced Configuration and Power Interface (ACPI) standard (e.g., Rev. 3.0b, published Oct. 10, 2006) for optimizing the system in these areas.

Many computer systems may often require a surge of power well above normal design limits of most power regulators when in a higher frequency/performance state, generally referred to as a turbo mode. To handle the surges, most systems provide a costly over-design of the voltage regulator. Sudden power loads in computer systems also produce transients in the system's power supply, which can cause issues with proper system operation. This is usually remedied with the addition of bulk output capacitors. However, this is an expensive method of resolving the issue.

DETAILED DESCRIPTION

In various embodiments, a secondary voltage regulator circuit may be configured to provide additional power to a load on a temporary basis to prevent overloading a primary voltage regulator. For purposes of discussion herein, the embodiments described are with regard to voltage regulators for a computer system. While one such embodiment may be for purposes of a server computer system, understand the scope of the present invention is not limited in this regard and embodiments are highly scalable to enable solutions for many different types of computer systems, ranging from higher power systems such as server-based systems to low power systems such as portable computers such as laptop or Ultrabook™, tablet computers, smartphones and other portable devices. Embodiments apply equally to systems having power requirements in between high power and low power systems such as desktop computers.

In general, embodiments include an extra voltage regulator to provide additional output current for a load in times of high power requirements. By providing this additional voltage regulator, a primary voltage regulator can be designed with less stringent requirements (and size), e.g., fewer phases, thus providing a primary voltage regulator that is cheaper, smaller, more power efficient, and dissipates less temperature and power, thus enabling smaller systems. Still further, the need for greater amounts of capacitors and total capacitance such as bulk output capacitors to provide for extra current capacity (delivery and/or absorption) also can be avoided, again reducing the cost and size of a given solution.

Figure 1:
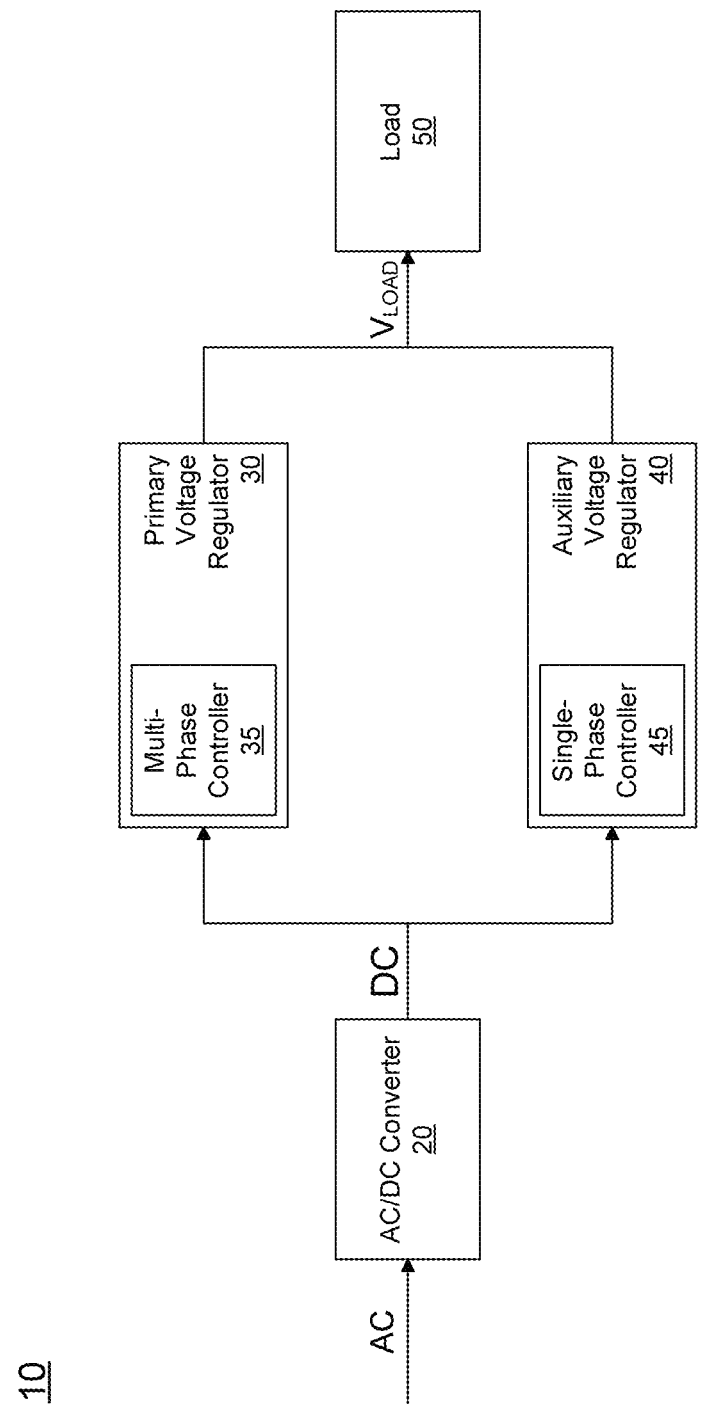
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 10 illustrates a portion of a computer system, namely a power delivery system of the platform. In general, the power delivery system includes a front end converter, namely an AC-DC converter 20 that receives input power, e.g., from a wall source, and converts the received AC signal, e.g., received at 120 volts to a lower DC voltage, e.g., a 12 volt signal. As seen, this DC voltage output from converter 20 may be provided to multiple voltage regulators, namely a primary voltage regulator 30 and an auxiliary voltage regulator 40. In general, primary voltage regulator 30 may provide one or more regulated voltages to various components of a system, generally shown in FIG. 1 as a load 50. For example, elements of load 50 may include one or more processors such as one or more central processing units (CPUs), memory, other integrated circuits and additional system components such as storage devices, peripheral devices and so forth.

At the high level of FIG. 1, primary voltage regulator 30 is shown to include a multi-phase controller 35 which in an embodiment may be a pulse width modulation (PWM) controller to provide a number of phases to generate the one or more regulated voltages. In various examples described herein, this multi-phase controller may be a four-phase controller. That is, by using an embodiment of the present invention having an additional auxiliary voltage converter, the need for greater numbers of phases such as a six phase or eight phase system in order to provide sufficient current delivery needs for a system undergoing temporary load increases can be avoided.

In turn, auxiliary voltage regulator 40 may include a single phase controller 45 that can thus provide additional output current to load 50 under high load conditions which, as will be described further below may only be present for very short time periods (e.g., a duration of up to 5 milliseconds (ms)). As one example, assume a server system that includes a processor that operates at a TDP level of approximately 100 watts and at a current consumption level of approximately 100 amperes. Instead, during a turbo mode operation, the processor may require much higher current delivery to enable operation at a turbo mode frequency, e.g., on the order of approximately 200 amperes. Via the combination of maximum current output by the primary voltage regulator and excess current provided by the auxiliary voltage regulator, this increased current delivery can be achieved. Although shown in FIG. 1 as a single phase controller, understand in other embodiments the auxiliary voltage regulator may include a multi-phase controller or any other type of controller.

The outputs of the two voltage regulators may thus couple to load 50 such that additional current required in excess of a maximum current provided by primary voltage regulator 30 can be realized via the output of auxiliary voltage regulator 40. Note that in normal circuit conditions in which a higher load is not present and current capacity can be met within the maximum current output from primary voltage regulator 30, auxiliary voltage regulator 40 may be in a low power or powered off state to thus reduce power dissipation. Understand that while in many implementations this power delivery system may be present on a motherboard or other circuit board of the system, other embodiments may be incorporated within a processor package such as an integrated voltage regulator of one or more semiconductor dies of the package. Although shown at this high level in the embodiment of FIG. 1, understand the scope of the present invention is not limited in this regard.

Figure 2:
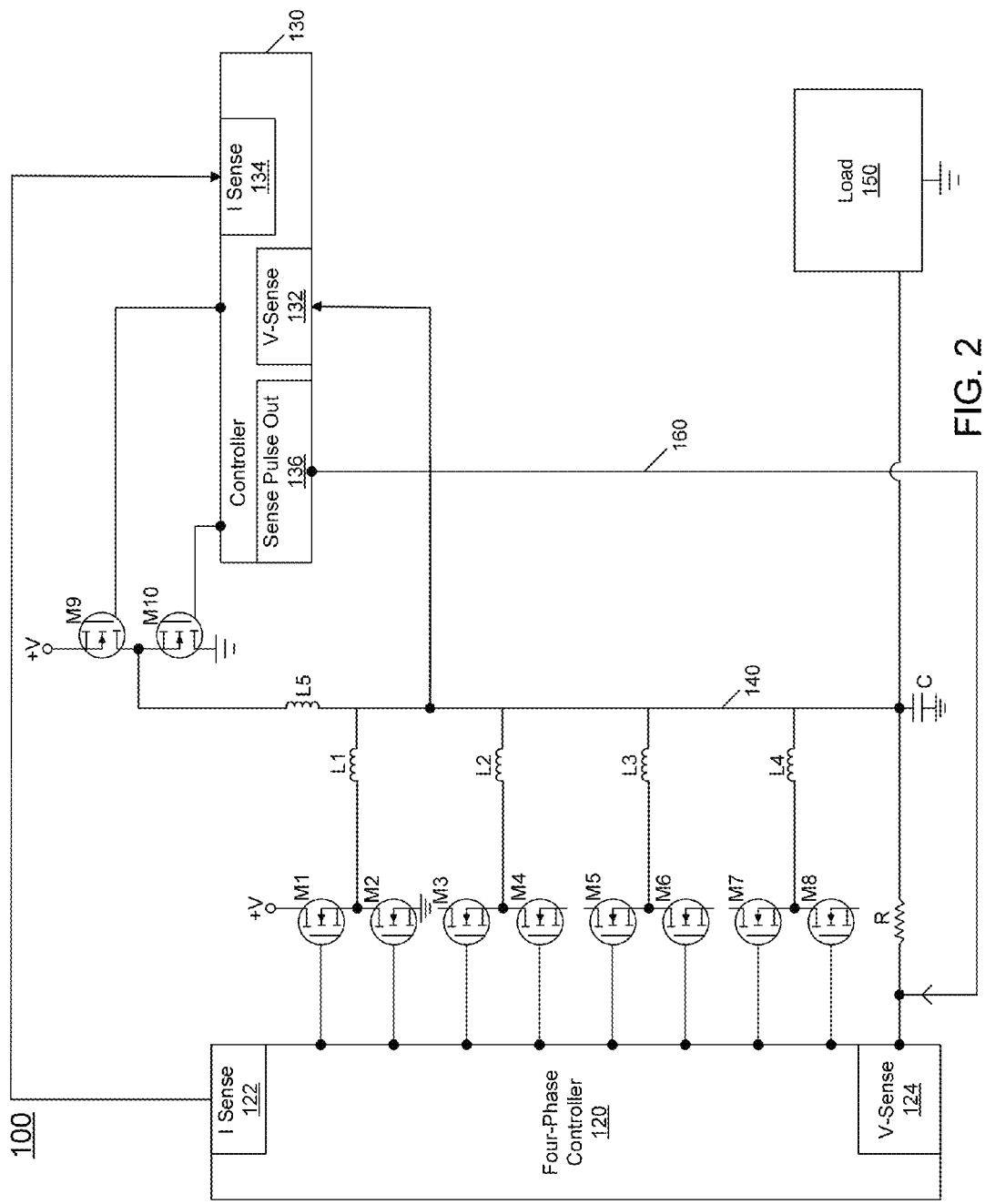
FIG. 2 is a schematic diagram illustrating further details of a voltage regulation mechanism in accordance with an embodiment of the present invention.

Referring now to FIG. 2, shown is a schematic diagram illustrating further details of a voltage regulation mechanism in accordance with an embodiment of the present invention. As shown in FIG. 2, circuit 100 may include portions of both a primary voltage regulator and an auxiliary voltage regulator. More specifically, a controller 120 may be a four-phase PWM controller for purposes of providing control signals to a plurality of switching devices, namely a plurality of metal oxide semiconductor field effect transistors (MOSFETs) M1-M8. Specifically, four pairs of MOSFETs each may couple between a supply voltage (e.g., a 12-volt DC supply) and a reference voltage (e.g., a ground voltage) (connections only shown as to MOSFETs M1 and M2). Note that in several embodiments, the supply voltage may be a regulated voltage provided by a front end converter. In general, controller 120 may operate to iteratively enable in turn the top MOSFET of each phase (coupled to the supply voltage node) to be active to thus output a regulated voltage via a supply or output line 140 to a load 150. Stated another way, a first phase output enabled by selective control of MOSFETs M1 and M2 may output a first pulse of a regulated voltage for a first phase, then selective control of MOSFETs M3 and M4 may output a second pulse of the regulated voltage for a second phase and so forth. In an embodiment, this selective switching may be such that when a given phase is active, the top MOSFET may be turned on to thus provide the regulated voltage to the output line (and the bottom MOSFET is turned off). Instead when the corresponding phase is off, the bottom MOSFET may be turned on (and the top MOSFET turned off) to thus enable the voltage on the output line to average out to the desired voltage.

As further seen, each phase output may include an inductor L1-L4 coupled to output line 140. Note also the presence of an output capacitance C on this line. This capacitance may be on the order of between approximately 0.0008 and 0.005 Farads. In general the inductors and capacitance provide filtering of the output voltage provided to the load to thus deliver the appropriate current to the load. Given the ability to provide acceptable current levels for higher power operation (and also to reduce the effect of transients on the line), this capacitance may be much lower than in systems without an auxiliary voltage regulator. As such, the need for specialty bulk output capacitors can be avoided. In various embodiments, this capacitance C can be implemented via standard electrolytic capacitors, providing for a more inexpensive and smaller solution.

As further seen in FIG. 2, an auxiliary controller 130, which in an embodiment may be a single phase hysteretic controller, provides additional current to the line when a high output current is required by the load. In various embodiments, controller 130 may automatically provide additional output current based on the sensed conditions on output line 140. In one embodiment, a voltage on output line 140 may be detected in a voltage sense circuit 132 of the hysteretic controller 130. The detected voltage may be provided to a first input of a comparator, which further has a second input that receives a predetermined voltage threshold that indicates the voltage for the maximum continuous current output of the regulator. That is, the voltage output by the primary regulator reduces proportionately with an increase in the output current, causing a droop in the output voltage. When the output line 140 that is sensed by controller 130 reaches a point at which the primary voltage regulator is supplying its maximum output current, a triggering event may occur.

Note that the comparator may have hysteresis to enable different threshold values to be used for turning on and turning off this auxiliary voltage regulator. This operation may occur such that after a threshold detection occurs (namely when the detected voltage falls below a first threshold value) this auxiliary voltage regulator is turned on. However, this regulator does not turn off when the output voltage exceeds this first threshold, but instead when it exceeds a second, higher threshold to provide a measure of hysteresis.

Also as will be described further below, there may be multiple comparators present within the voltage sense circuit to enable detection of negative transients as here, as well as positive-going transients, described further below. In addition, the auxiliary voltage regulator may be programmable by adjusting one or more reference voltages provided to the comparators.

When the detected voltage on the supply line falls below the threshold, the comparator output triggers, turning on the extra phase to provide additional current. More specifically when this detected voltage falls below a certain threshold level (e.g., a low level threshold), hysteretic controller 130 may generate a drive signal to control another pair of MOSFETs M9 and M10 to thus provide additional voltage onto the output line 140 through an additional inductor L5, enabling greater current delivery to load 150. When enabled by the appropriate drive signals, the top MOSFET M9 turns on, providing additional voltage while at the same time bottom MOSFET M10 is switched off. Note that in contrast to the switches associated with controller 120, both MOSFETs M9 and M10 may be turned off when this secondary voltage regulator is not active. That is, when additional current requirements are not needed and the auxiliary voltage regulator is not active, this bottom MOSFET M9 if enabled would hold down the regulated voltage provided by the primary regulator. Thus when the auxiliary voltage regulator is not active, both MOSFETs M9 and M10 may be turned off.

Note that the controller 120 does not detect or otherwise comprehend that extra current is being required. Instead the primary voltage regulator outputs its maximum current level and any increase in current above this maximum current required by the load is provided via the secondary voltage regulator, so the stability of the primary voltage regulator is not upset during normal operation. In the absence of turbo mode, the additional voltage regulator is not active and thus does not dissipate any power.

During normal operations (namely in the absence of a high load requirement), controller 130 may be in a low power state in which only its voltage sense circuit 132 is enabled. Note that in certain embodiments, instead of performing a voltage sense operation, a current sense operation may be performed by an internal current detector circuit 134, which as seen may receive a sensed current value from a current detection circuit 122 of voltage regulator 120.

Some embodiments may provide for both detection mechanisms while other embodiments may provide only a single one. With multiple detection mechanisms, if the primary voltage regulator does not provide a droop in the output voltage responsive to an increase in current, the sensed current provided to controller 130 via sense circuit 134 may thus trigger operation based on this output current sense rather than the voltage. As such, controller 130 may enable the auxiliary voltage regulator to supply additional current to prevent the primary voltage regulator from exceeding its maximum current rating. Although shown at this high level in the embodiment of FIG. 2, understand the scope of the present invention is not limited in this regard.

Embodiments may also provide a capability to suppress positive transients. Such transients occur when a heavy load suddenly disappears. Note that this positive transient can be detected by a separate comparator (which may be another comparator with hysteresis) within voltage sense circuit 132 to thus detect when the voltage on the output line exceeds a threshold level. This threshold level may be set at a different value than the threshold for the negative-going transient comparator above. In this case, the current output via the inductors coupled to the output line will produce a positive-going transient. To absorb the energy on a positive transient, the auxiliary regulator will turn on the bottom MOSFET M10. In addition, controller 130 includes a sense pulse circuit 136 to generate an output pulse on a sense line 160 to controller 120, giving a little extra positive voltage on sense line 160 received by a voltage sense circuit 124 of controller 120, to prevent any extra output pulses that would have occurred during that positive transient. As such, embodiments reduce a positive transient without having to add more capacitors to absorb this energy.

Embodiments may thus provide a low cost alternative that is economical and requires less board space to provide a power boost to add power to a lower power regulator. In this way an increased power delivery such as used during a turbo mode can be realized without the need for a higher power regulator. As such, excessive negative transients during a turbo mode or other higher power operations can be prevented or reduced.

Figure 3A:
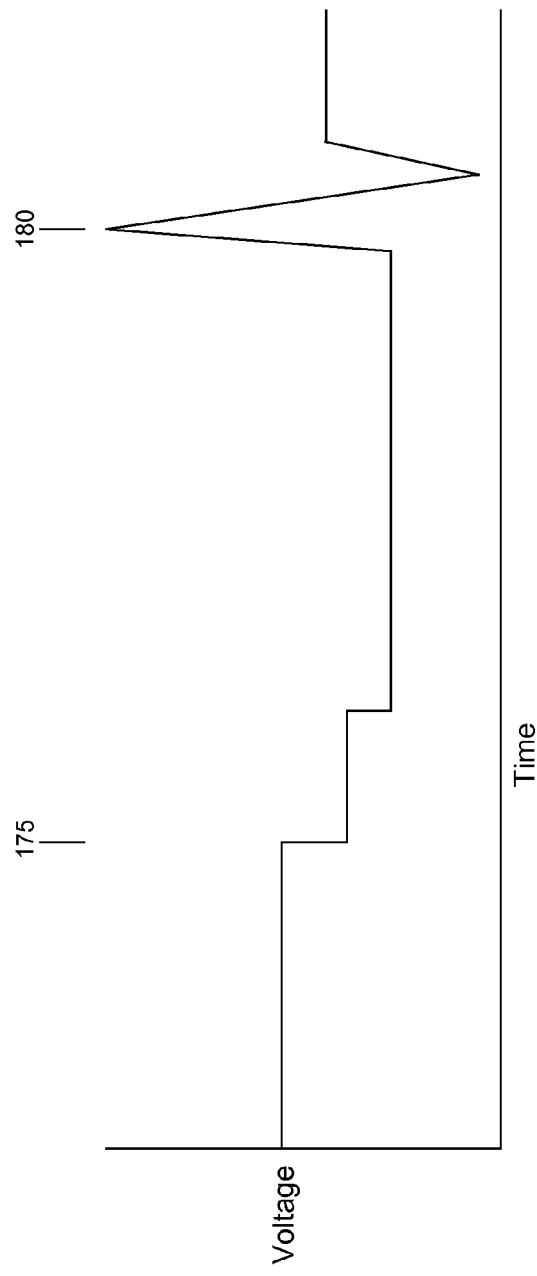
FIGS. 3A and 3B are simulations of voltage output by different regulator implementations.
Figure 3B:
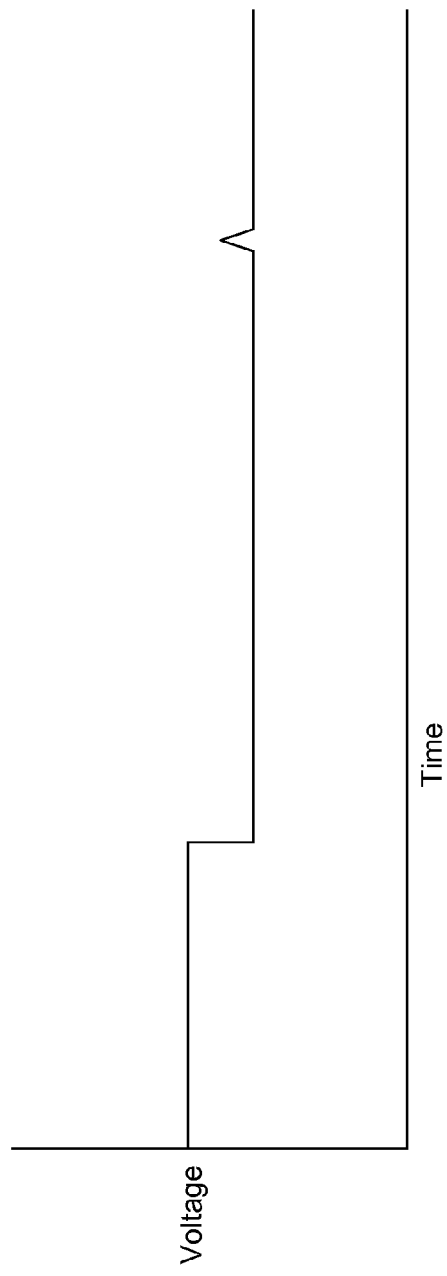

Referring now to FIGS. 3A and 3B, shown are simulations of voltage output by a single regulator without an embodiment of the present invention (in FIG. 3A) and a voltage output by a combined primary regulator and auxiliary voltage regulator as described herein (in FIG. 3B). As seen in FIG. 3A, when a greater current delivery is required, e.g., due to a turbo mode of a processor occurring at a time instant 175, a negative going voltage transient occurs, with the voltage being unstable for some amount of time. Then when the turbo mode is ended at time instant 180, a large positive going voltage transient occurs due to the drop in current levels delivered to the processor. Instead as seen in FIG. 3B, using an embodiment of the present invention, much lower levels of voltage transients occur, both for initiation of a turbo mode and its ending, and a processor can operate without any adverse effects. In addition, by providing a smoother voltage, a greater processor lifetime may be achieved.

Figure 4:
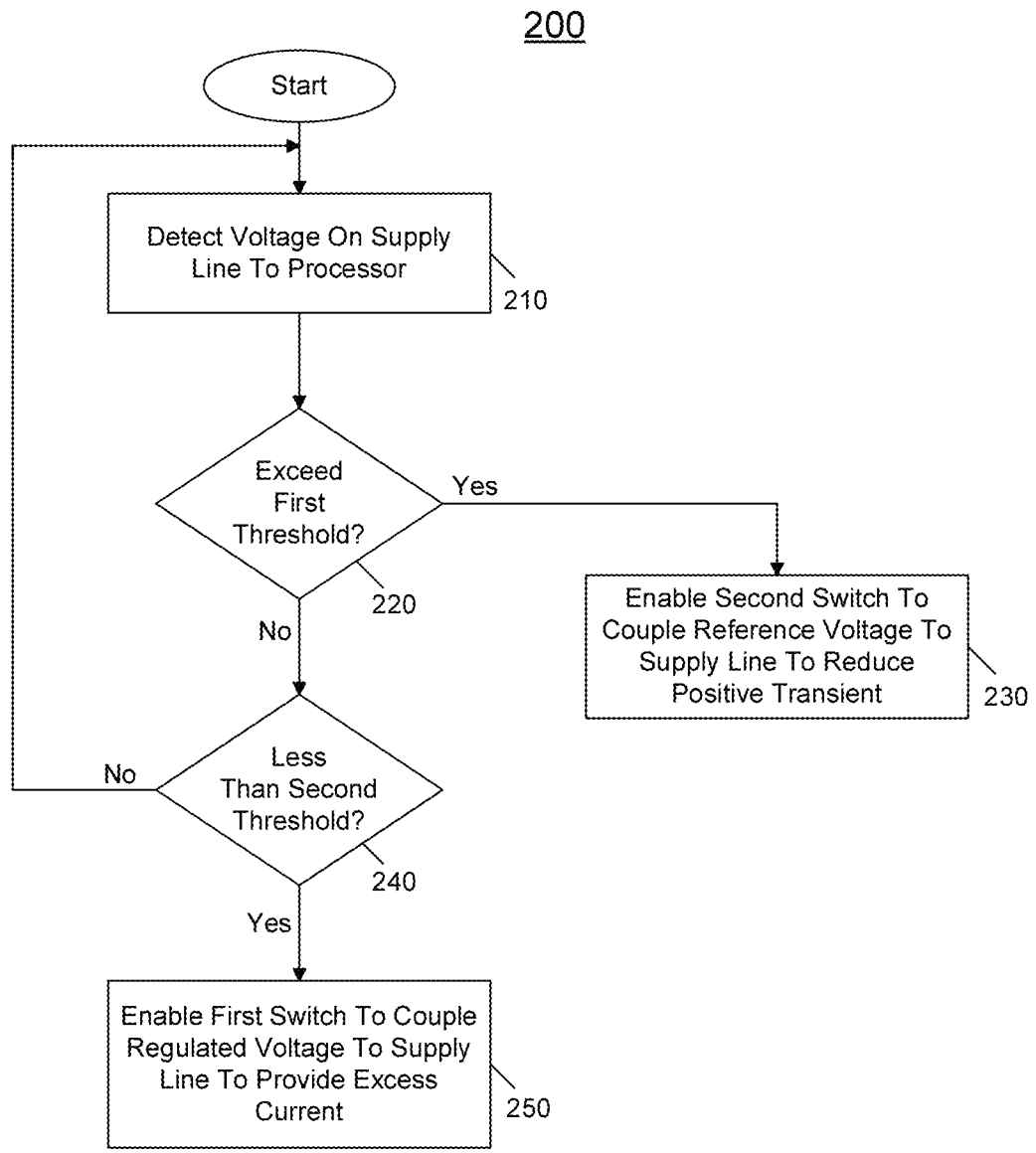
FIG. 4 is a flow diagram of operation of an auxiliary voltage regulator in accordance with an embodiment of the present invention.

Referring now to FIG. 4, shown is a flow diagram of operation of an auxiliary voltage regulator in accordance with an embodiment of the present invention. As seen in FIG. 4, method 200 may be performed within the auxiliary voltage regulator, such as within logic of a hysteretic controller. As seen method 200 may begin by detecting a voltage on a supply line to a processor (block 210). Thus the embodiment shown in FIG. 4 is for a voltage detection-based control. Understand that however in other embodiments a current-based control may instead be present. At diamond 220 it can be determined whether this detected voltage exceeds a first threshold, which in an embodiment may be a threshold to detect a positive-going transient voltage. If this threshold is exceeded, control passes to block 230 where a second switch can be enabled to couple a reference voltage to the supply line. More specifically, with reference back to FIG. 2, bottom MOSFET M10 may be enabled to couple the supply line to a ground voltage to thus reduce the voltage on the supply line.

Referring still to FIG. 4, if instead at diamond 220 it is determined that this first threshold level is not exceeded, control passes to diamond 240 to determine whether this detected voltage is less than a second threshold. This second threshold may correspond to a threshold to determine presence of a negative going transient. If such detection occurs, control passes to block 250 where a first switch may be enabled to couple a regulated voltage to the supply line to thus provide extra current. More specifically with reference to FIG. 2 above, top MOSFET M9 may be enabled to thus supply additional current via the supply line to enable to processor to operate in a higher current consumption mode, e.g., for a turbo mode. Of course, from both of blocks 230 and 250, additional detections to determine when a voltage passes a hysteresis threshold may occur, thus causing the enabled switch to be disabled. Although described at this high level in the embodiment of FIG. 4, understand the scope of the present invention is not limited in this regard and a current detection scheme may be used in other embodiments.

According to an OS-based ACPI mechanism, a processor can operate at various power and performance states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states). When all cores of a multicore processor are in a core low power state, the processor can be placed in a package low power state, such as a package C6 low power state.

In addition to these power states, a processor can further be configured to operate at one of multiple performance states, P-states, namely from P0 to PN. In general, the P1 performance state may correspond to the highest guaranteed performance state that can be requested by an OS. In addition to this P1 state, the OS can further request a higher performance state, namely a P0 state or turbo mode. This P0 state may thus be an opportunistic state in which, when power and thermal budget is available, processor hardware can configure the processor or at least portions thereof to operate at a higher than guaranteed frequency. In many implementations a processor can include multiple so-called bin frequencies, also referred to as turbo mode frequencies, above this P1 frequency. The highest such frequency may correspond to a maximum turbo frequency (P01), which is the highest frequency at which a domain can operate. This maximum turbo frequency thus is the highest end of multiple turbo mode frequencies greater than the P1 frequency and corresponds to a maximum non-guaranteed highest performance level that can be achieved. Note that the terms "performance state" or "P-state" can be interchangeably used with the term "operating frequency" (or more generally "frequency") as the frequency at which a core operates has a direct correlation to its performance. Thus as used herein a higher performance state correlates to a higher operating frequency.

A processor in accordance with an embodiment of the present invention may include fully integrated voltage regulation (FIVR) such that per core P-states (PCPS) can be provided. In this way, cores can be operated at frequencies and voltages independently of each other. The PCPS feature allows individual cores of a multicore processor to concurrently operate at different frequencies within the overall power, electrical, thermal and stock keeping unit (SKU) constraints.

In various embodiments, PCPS enables operation of individual physical cores at different voltage/frequency points concurrently based on OS requested performance on the logical cores associated with a physical core. That is, the operating point of each core can be configured independently of the other cores (within overall system power and thermal constraints). In one embodiment of the invention, PCPS is feasible due to the FIVR that is integrated in the processor. This regulator allows independent configuration of each core, where the configuration includes, but is not limited to, voltage setting, frequency setting, and other parameters that affect the power consumption of each core. In some embodiments the integrated voltage regulators may implement a primary/secondary regulator approach as described above.

In a FIVR implementation in which each core within a processor has its own voltage regulator, one or more additional voltage regulators may be provided for use with other components within a processor such as uncore logic, memory controller logic, power control unit, and so forth. Of course, in some embodiments a single voltage regulator may be associated with one or more cores and/or other components of a processor. In one embodiment, a dedicated voltage regulator may be provided for uncore circuitry of a processor, which would allow the uncore to run at a different voltage and frequency. For a compute centric workload, the uncore can be run at a lower voltage and frequency, resulting in applying power savings toward higher core frequencies at a socket level. For memory and IO intensive workloads, the uncore can be run at a higher voltage and frequency, while the cores can run at lower voltages/frequencies, compensating for higher power consumption in the uncore.

Figure 5:
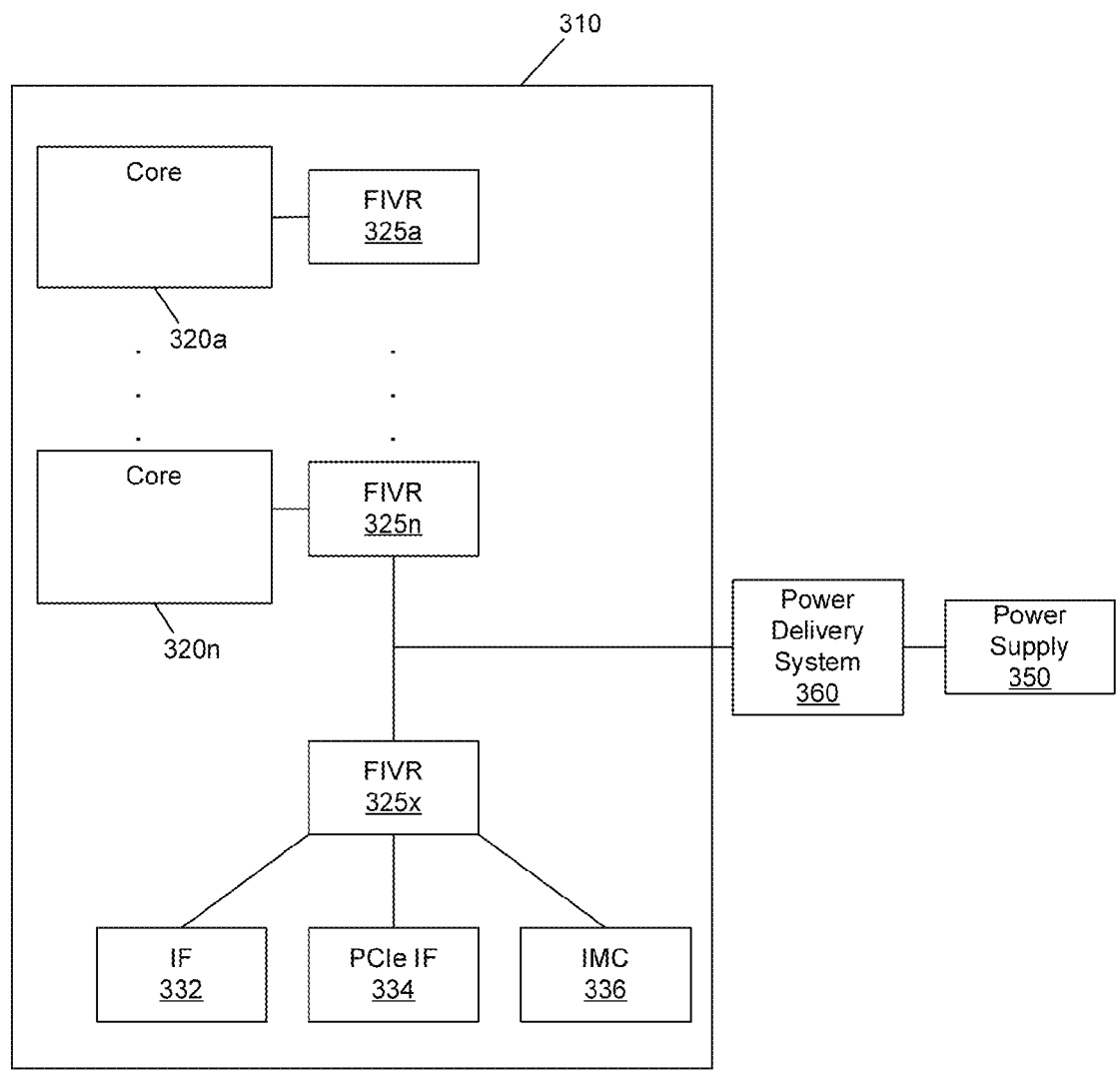
FIG. 5 is a block diagram of a portion of a system in accordance with an embodiment of the present invention.

Referring now to FIG. 5, shown is a block diagram of a portion of a system in accordance with an embodiment of the present invention. As shown in FIG. 5, system 300 may include various components, including a processor 310 which as shown is a multicore processor. Processor 310 may be coupled to a power supply 350 via an external power delivery system 360, which may include the primary and secondary voltage regulators as described above to provide a primary regulated voltage to processor 310.

As seen, processor 310 may be a single die processor including multiple cores $320_a$-$320_n$. In addition, each core may be associated with an individual voltage regulator $325_a$-$325_n$. Accordingly, a FIVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 5, additional components may be present within the processor including an input/output interface 332, another interface 334, and an integrated memory controller 336. As seen, each of these components may be powered by another integrated voltage regulator $325_x$. In one embodiment, interface 332 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 334 may be in accordance with a Peripheral Component Interconnect Express (PCIe™) specification, e.g., the PCI Express™ Specification Base Specification version 2.0 (published Jan. 17, 2007). While not shown for ease of illustration, understand that additional components may be present within processor 310 such as uncore logic, a power control unit, and other components such as internal memories, e.g., one or more levels of a cache memory hierarchy and so forth. Furthermore, while shown in the implementation of FIG. 5 with an integrated voltage regulator, embodiments are not so limited.

Figure 6:
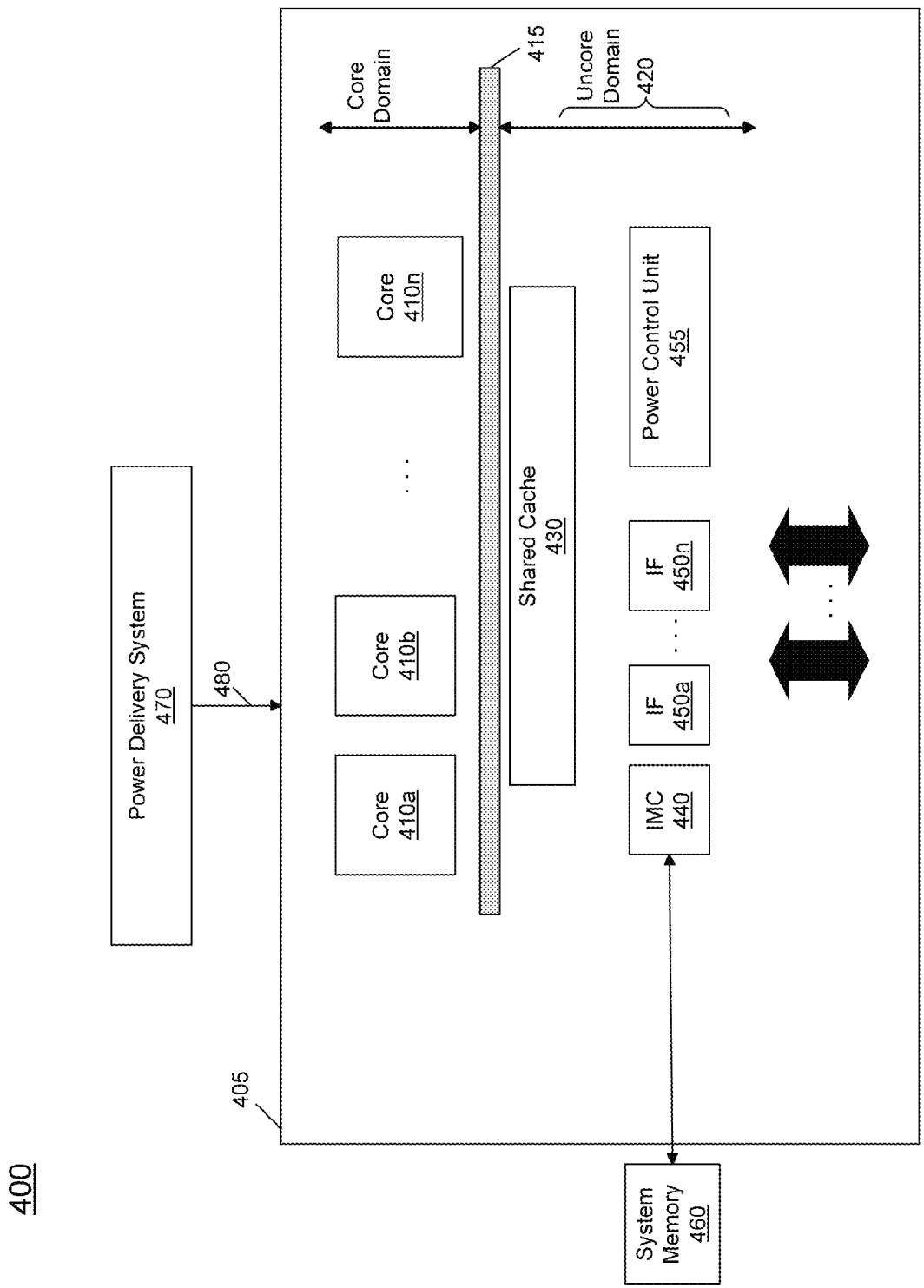
FIG. 6 is a block diagram of a system in accordance with another embodiment of the present invention.

Referring now to FIG. 6, shown is a block diagram of a system in accordance with an embodiment of the present invention. As shown in FIG. 6, system 400 includes a processor 405, which may be a multicore processor having a plurality of cores $410_a$-$410_n$ of a core domain. In one embodiment, each such core may be of an independent power domain and can be configured to operate at an independent voltage and/or frequency, and to enter a turbo mode when available headroom exists. The various cores may be coupled via an interconnect 415 to a system agent or uncore domain 420 that includes various components. As seen, the uncore domain 420 may include a shared cache 430 which may be a last level cache. In addition, the uncore may include an integrated memory controller 440, various interfaces 450 and a power control unit 455.

With further reference to FIG. 6, a power delivery system 470 with primary and secondary voltage regulators as described above can couple to processor 405 via a supply line 480. Processor 405 may communicate with a system memory 460, e.g., via a memory bus. In addition, by interfaces 450, connection can be made to various off-package components such as peripheral devices, mass storage and so forth. While shown with this particular implementation in the embodiment of FIG. 6, the scope of the present invention is not limited in this regard.

Figure 7:
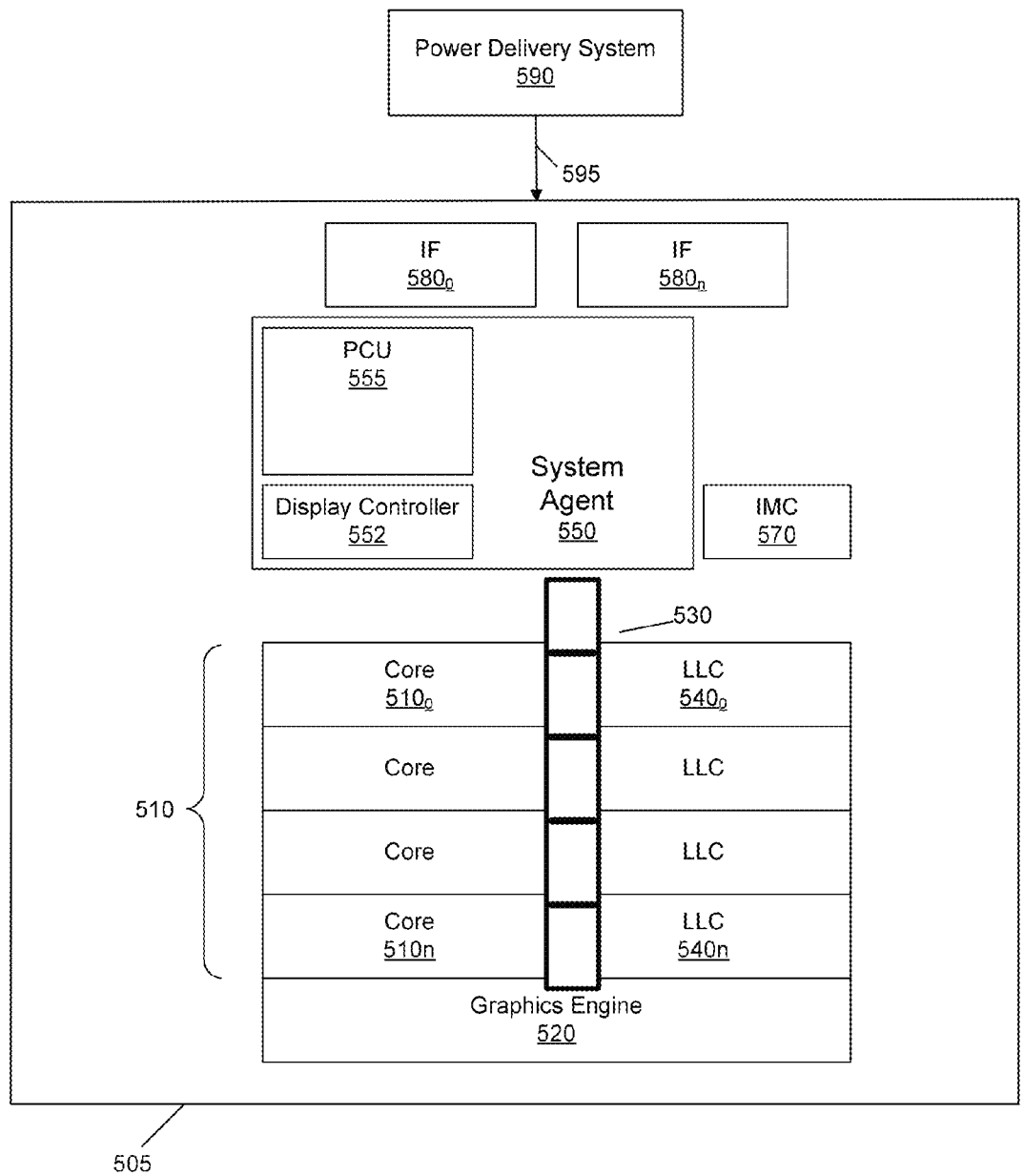
FIG. 7 is a block diagram of a system including a multi-domain processor in accordance with another embodiment of the present invention.

Referring now to FIG. 7, shown is a block diagram of a system including multi-domain processor in accordance with another embodiment of the present invention. As shown in the embodiment of FIG. 7, system 500 has a processor 505 including multiple domains. Specifically, a core domain 510 can include a plurality of cores $510_0$-$510_n$, a graphics domain 520 can include one or more graphics engines, and a system agent domain 550 may further be present. In various embodiments, system agent domain 550 may execute at a fixed frequency and may remain powered on at all times to handle power control events and power management and each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 7, system agent domain 550 may include display controller 552 which may provide control of and an interface to an associated display. As further seen, system agent domain 550 may include a power control unit 555 to control entry into and exit from turbo mode operation.

As further seen in FIG. 7, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. A power delivery system 590 with primary and secondary voltage regulators as described above can couple to processor 505 via a supply line 595. Although shown at this high level in the embodiment of FIG. 7, understand the scope of the present invention is not limited in this regard.

Figure 8:
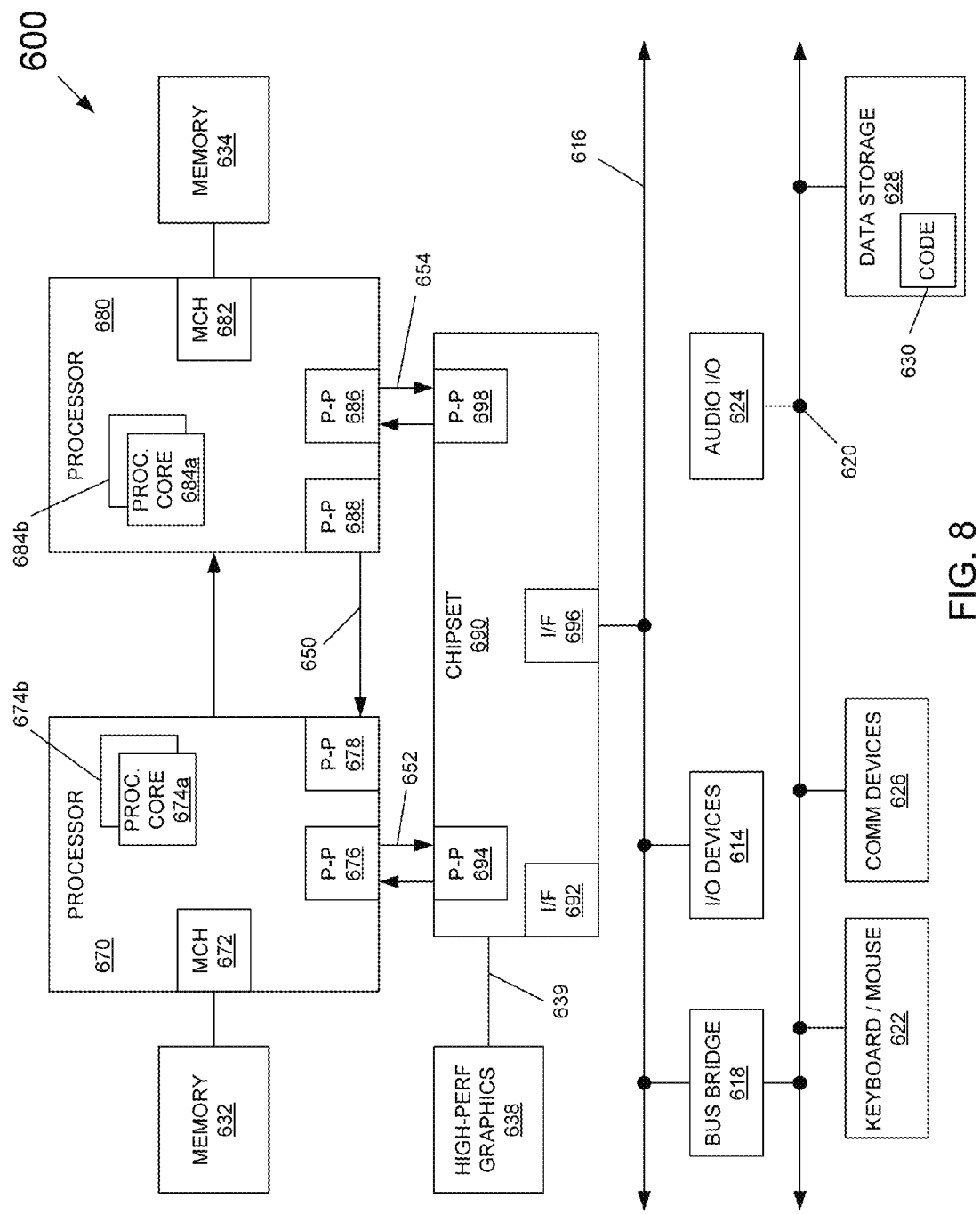
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to control entry into and exit from turbo modes, and the processor may receive sufficient current in such modes using a power delivery system, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 8, chipset 690 includes P-P interfaces 694 and 698.

Furthermore, chipset 690 includes an interface 692 to couple chipset 690 with a high performance graphics engine 638 by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a primary voltage regulator to couple a regulated voltage to a device via a supply line, the primary voltage regulator including a multi-phase controller to provide the regulated voltage in a plurality of phases, wherein the primary voltage regulator is to provide a maximum current output sufficient to meet a thermal design power (TDP) of the device; and
an auxiliary voltage regulator to provide an excess current to the device via the supply line for a time limited duration, the auxiliary voltage regulator including a detector to detect a state on the supply line and to automatically provide the excess current based on the supply line state.

2. The apparatus of claim 1, wherein the detector comprises a voltage detector including a first comparator to receive a voltage on the supply line and to cause the auxiliary voltage regulator to automatically provide the excess current responsive to a negative voltage level on the supply line.

3. The apparatus of claim 2, wherein the detector is to cause the auxiliary voltage regulator to automatically provide the excess current when the voltage on the supply line is less than a first threshold.

4. The apparatus of claim 2, wherein the voltage detector includes a second comparator to detect the voltage on the supply line and to cause the auxiliary voltage regulator to automatically reduce the voltage responsive to a positive transient voltage on the supply line.

5. The apparatus of claim 4, wherein the auxiliary voltage regulator comprises a hysteretic controller to couple a second switch to the supply line to couple a reference voltage to the supply line responsive to the positive transient voltage.

6. The apparatus of claim 5, wherein the hysteretic controller includes the second switch and a first switch coupled to a supply voltage node, the first and second switches to be turned off when current consumption of the device is at or below the maximum current output.

7. The apparatus of claim 1, wherein the detector comprises a current detector to detect the maximum current output provided from the primary voltage regulator and to cause the auxiliary voltage regulator to automatically provide the excess current responsive to the detection of the maximum current output.

8. The apparatus of claim 1, wherein the auxiliary voltage regulator comprises a single phase controller to provide the excess current.

9. The apparatus of claim 1, wherein the auxiliary voltage regulator is to provide the excess current when a processor corresponding to the device is in a turbo mode in which at least one core of the processor is to operate at a turbo mode frequency.

10. The apparatus of claim 9, wherein the primary voltage regulator is insufficient to provide sufficient output current for the turbo mode.

11. The apparatus of claim 10, wherein the primary voltage regulator and the auxiliary voltage regulator are to provide the sufficient output current.

12. The apparatus of claim 9, wherein the time limited duration corresponds to a duration of the turbo mode.

13. The apparatus of claim 1, wherein the auxiliary voltage regulator is to be in a low power state when the device is in operation below the TDP.

14. A method comprising:
  detecting, in a controller of an auxiliary voltage regulator coupled to a processor, a voltage on a supply line coupled to the processor, wherein a primary voltage regulator is also coupled to the processor;
  determining whether the detected voltage is less than a second threshold; and
  if so, enabling, via the controller of the auxiliary voltage regulator, a first switch to couple a first voltage to the supply line to provide excess current to the processor, wherein the primary voltage regulator is providing a maximum output current to the processor via the supply line.

15. The method of claim 14, further comprising determining whether the detected voltage exceeds a first threshold, the first threshold higher than the second threshold.

16. The method of claim 15, further comprising enabling, via the controller of the auxiliary voltage regulator, a second switch to couple a reference voltage to the supply line to reduce a positive transient voltage on the supply line responsive to the determination of the detected voltage exceeding the first threshold.

17. The method of claim 15, further comprising providing an output pulse signal from the controller of the auxiliary voltage regulator to a controller of the primary voltage regulator to prevent output of one or more output pulses onto the supply line from the primary voltage regulator, responsive to the determination of the detected voltage exceeding the first threshold.

18. A processor comprising:
  a plurality of cores each to independently execute instructions and to operate at an independent voltage and frequency and to independently enter a turbo mode of operation; and
  a plurality of integrated voltage regulators each to receive a regulated voltage and provide a voltage to one of the plurality of cores, wherein the plurality of integrated voltage regulators receive the regulated voltage from a power delivery system via a supply line, the power delivery system including:
    a primary voltage regulator to couple the regulated voltage to the supply line and including a multi-phase controller to provide the regulated voltage in a plurality of phases and to deliver a maximum current output sufficient to meet a thermal design power (TDP) of the processor; and
    an auxiliary voltage regulator to deliver an excess current to the processor via the supply line during the turbo mode.

19. The processor of claim 18, further comprising a power controller to enable a first core of the plurality of cores to operate at a turbo mode frequency in the turbo mode, wherein the auxiliary voltage regulator is to deliver the excess current during the turbo mode while the primary voltage regulator is to deliver the maximum current output, a combination of the maximum current output and the excess current sufficient to meet a current consumption of the processor during the turbo mode.

20. The processor of claim 19, wherein the power controller is to cause the first core to exit the turbo mode, and the auxiliary voltage regulator is to cause a switch to couple a reference voltage to the supply line to reduce a positive transient voltage on the supply line responsive to the exit from the turbo mode.

* * * * *